(12) United States Patent
Chi et al.

(10) Patent No.: US 7,620,240 B2
(45) Date of Patent: Nov. 17, 2009

(54) METHOD OF ENCODING AND DECODING IMAGE DATA BY APPLYING IMAGE CAPTURING DEVICE

(75) Inventors: Fu-Chung Chi, Taipei (TW); Ping-Hang Lin, Taipei (TW)

(73) Assignee: ALI Corporation, Taipei (TW)

( * ) Notice: Subject to any disclaimer, the term of this patent is extended or adjusted under 35 U.S.C. 154(b) by 736 days.

(21) Appl. No.: 11/307,778

(22) Filed: Feb. 22, 2006

(65) Prior Publication Data

US 2006/0239570 A1    Oct. 26, 2006

(30) Foreign Application Priority Data

Apr. 26, 2005    (TW)    ............................... 94113237 A

(51) Int. Cl.
  *G06K 9/36*    (2006.01)
(52) U.S. Cl. ........................ 382/166; 382/262; 382/232; 382/233; 382/281; 382/240; 345/389; 345/604
(58) Field of Classification Search ................. 382/162, 382/166, 232, 233, 240, 274
See application file for complete search history.

(56) References Cited

U.S. PATENT DOCUMENTS

| | | | | |
|---|---|---|---|---|
| 5,402,185 A | * | 3/1995 | De With et al. | ........ 375/240.02 |
| 6,269,181 B1 | * | 7/2001 | Acharya | ..................... 382/162 |
| 6,825,876 B1 | * | 11/2004 | Easwar et al. | ................ 348/234 |
| 6,836,572 B2 | * | 12/2004 | Ishiga et al. | ................. 382/300 |
| 2003/0228068 A1 | * | 12/2003 | Dhavala et al. | ............. 382/281 |
| 2006/0198556 A1 | * | 9/2006 | Chen et al. | ................... 382/162 |

\* cited by examiner

*Primary Examiner*—Vikkram Bali
*Assistant Examiner*—Ali Bayat
(74) *Attorney, Agent, or Firm*—Winston Hsu

(57) ABSTRACT

A method of encoding and decoding image data by applying an image capturing device includes generating a difference coding group, applying a modified Hadamard transform (MHT) on the difference coding group to generate a corresponding low-frequency parameter and a plurality of corresponding high-frequency parameters, adjusting the low-frequency parameter, adjusting the high-frequency parameters by a quantification factor, decoding the low-frequency parameter, decoding the high-frequency parameters by the quantification factor, and applying an inverse modified Hadamard transform (IMHT) on the low-frequency parameter and the high-frequency parameters to decode the difference coding group.

8 Claims, 8 Drawing Sheets

| Q index | Ac 0 (green) | Ac 1 (green) | Ac 2 (green) | Ac 0 (non-green) | Ac 1 (non-green) | Ac 2 (non-green) |
|---|---|---|---|---|---|---|
| 0 | 0 | 0 | 0 | 0 | 0 | 0 |
| 1 | 1 | 1 | 2 | 1 | 2 | 2 |
| 2 | 2 | 2 | 3 | 2 | 3 | 3 |
| 3 | 3 | 3 | 4 | 3 | 4 | 4 |
| 4 | 4 | 4 | 5 | 4 | 5 | 5 |
| 5 | 5 | 5 | 6 | 5 | 6 | 6 |

Fig. 3

METHOD OF ENCODING AND DECODING IMAGE DATA BY APPLYING IMAGE CAPTURING DEVICE

BACKGROUND OF THE INVENTION

1. Field of the Invention

The present invention provides a method of data transformation, and more particularly, to a method of encoding and decoding image data by applying an image capturing device.

2. Description of the Prior Art

A rear part of a chip of a digital camera usually includes a large buffer to store necessary image data during calculation to complete necessary calculations of two-dimensional image data. However, in ordinary chips, the square measure of the buffer is always too large so that the cost of production is increased significantly. Under the presupposition that the images can be recognized by the naked eye, the size of the buffer is capable of being decreased by encoding techniques. Therefore the square measure of the chip is capable of being decreased significantly so that it is more convenient to use the chip, and that the production is decreased.

Prior art techniques for implementing image encoding include adaptive difference pulse coding and difference pulse coding methods. The principle of such techniques is reducing the amount of the image data to be decoded by taking advantage of the significant associability between adjoining pixels. Such techniques are not too difficult to be implemented. However, under some particular circumstances, for example, on the fringe of the image, where the variation of adjoining pixels is much more pronounced, the associability between adjoining pixels is decreased significantly. Therefore, the quality of image decoding in such implementations is decreased significantly.

Prior art techniques also frequently take advantage of the discrete cosine transform (DCT) so that the pixels (also called the parameters) are transformed from the time domain to the frequency domain and classified as low-frequency pixels and high-frequency pixels. A two-dimensional transform is sometimes used for performing the DCT, wherein the number of the sampled pixels during a single execution is 64 (an 8-by-8 array). Among the 64 pixels, all the pixels are high-frequency pixels except for the first pixel, which is a low-frequency pixel. Taking into account that low-frequency pixels are more likely to be important elements of the image, low frequency pixels are encoded with low distortion while high-frequency pixels are encoded with higher distortion (and consequently more compact encoding). Lastly, the inverse discrete cosine transform (IDCT) is performed so that the pixels are transformed from the frequency domain to the time domain. However, many bits used in performing the DCT causes a bottleneck in efficiency and storage. Therefore methods requiring fewer bits and less transforms between the time domain and the frequency domain are necessary.

SUMMARY OF THE INVENTION

Therefore the purpose of the present invention is providing a method for data transformation to solve the aforementioned problems.

The present invention discloses a method of encoding and decoding image data by applying an image capturing device. The method comprises generating a difference coding group according to green pixels and pixels of another color of a set of pixels, applying a modified Hadamard transform (MHT) on the difference coding group to generate a corresponding low-frequency parameter and a plurality of corresponding high-frequency parameters, adjusting the low-frequency parameter, adjusting the plurality of high-frequency parameters according to a quantification factor, decoding the adjusted low-frequency parameter, decoding the plurality of adjusted high-frequency parameters according to the quantification factor, and applying an inverse modified Hadamard transform (IMHT) on the decoded low-frequency parameter and the plurality of decoded high-frequency parameters to encode the difference coding group.

The embodiment of the present invention encodes and decodes image data by a combination of the MHT and channel difference coding. Therefore, the embodiment of the present invention is not as affected by low-quality image data caused by the associability of adjoining pixels in the prior art. Thus, the quality of the image data is improved.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a query table for operations of determining a value of a quantification factor according to the present invention.

DETAILED DESCRIPTION

Figure 1:
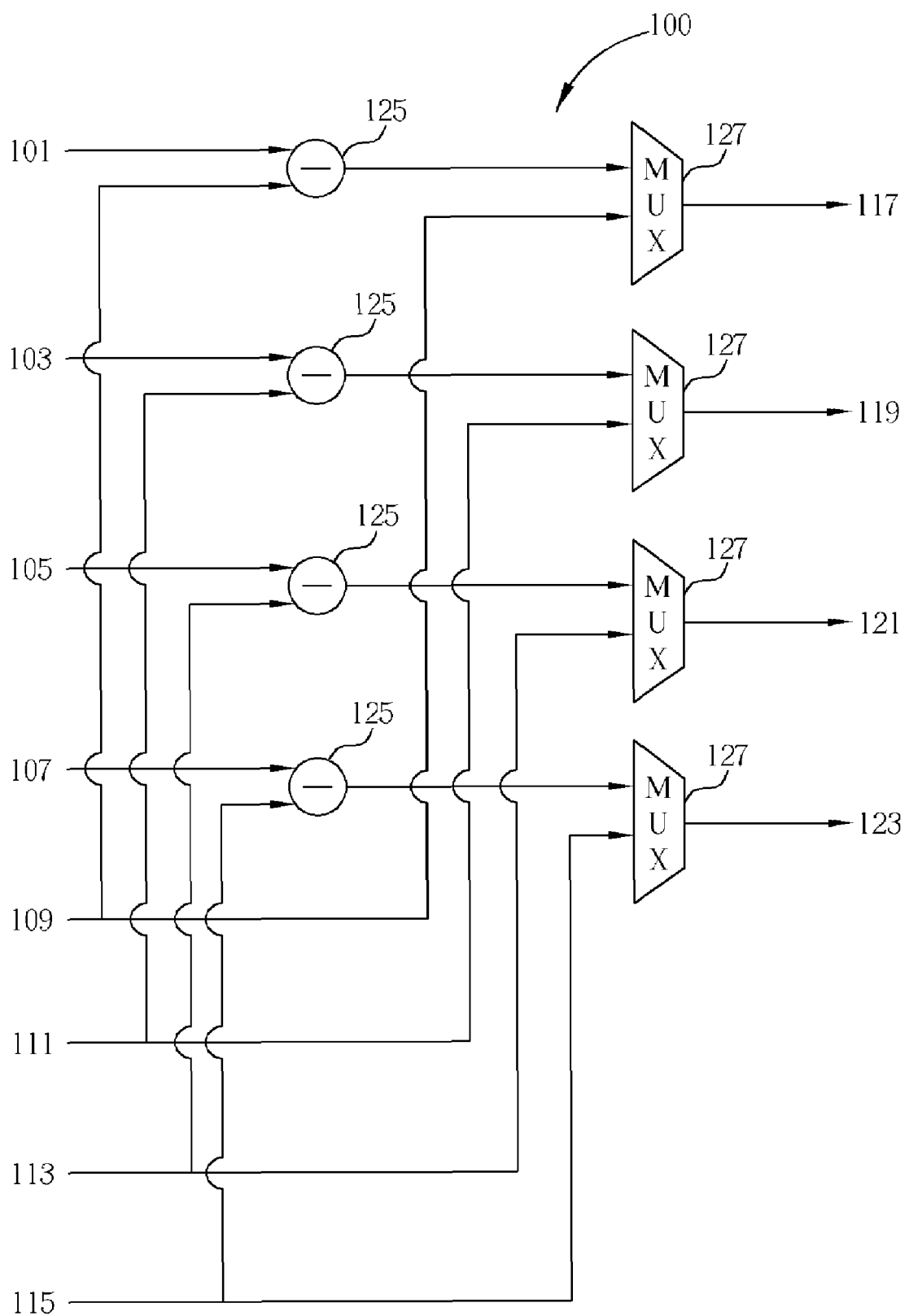
FIG. 1 is a diagram of a channel difference coding system according to the present invention.

Please refer to FIG. 1, which is a diagram of a channel difference coding system 100 for performing the channel difference coding in the present invention. The channel difference coding system 100 is capable of generating a difference coding group by a way of subtracting a green pixel group with an non-green pixel group. It is also capable of outputting a green pixel group directly. The channel difference coding system 100 comprises four subtracters 125, four multiplexers 127, four input nodes 109, 111, 113, 115, which are provided with the green pixels, and four output nodes 117, 119, 121, 123. Each subtracter 125 is connected with an input node provided with a non-green pixel and an input node provided with a green pixel, and is used to subtract the green pixel from the non-green pixel. Therefore the four subtracters 125 are capable of outputting a difference coding group. The channel difference coding system 100 is capable of generating two types of groups comprising a green pixel group and a difference coding group under control of the multiplexers 127. In FIG. 1, each multiplexer 127 comprises two inputs whose enabling states decide which type of group is to be generated. The inputted enabling states of the four multiplexers 127 are consistent with each other. According to FIG. 1, when the connections between the four multiplexers 127 and the four subtracters 125 are enabled, the four output nodes 117, 119, 121, 123 output a difference coding group. When the connections between the four multiplexers 127 and the four input nodes 109, 111, 113, 115 are enabled, the four output nodes 117, 119, 121, 123 output a green pixel group.

Figure 2:
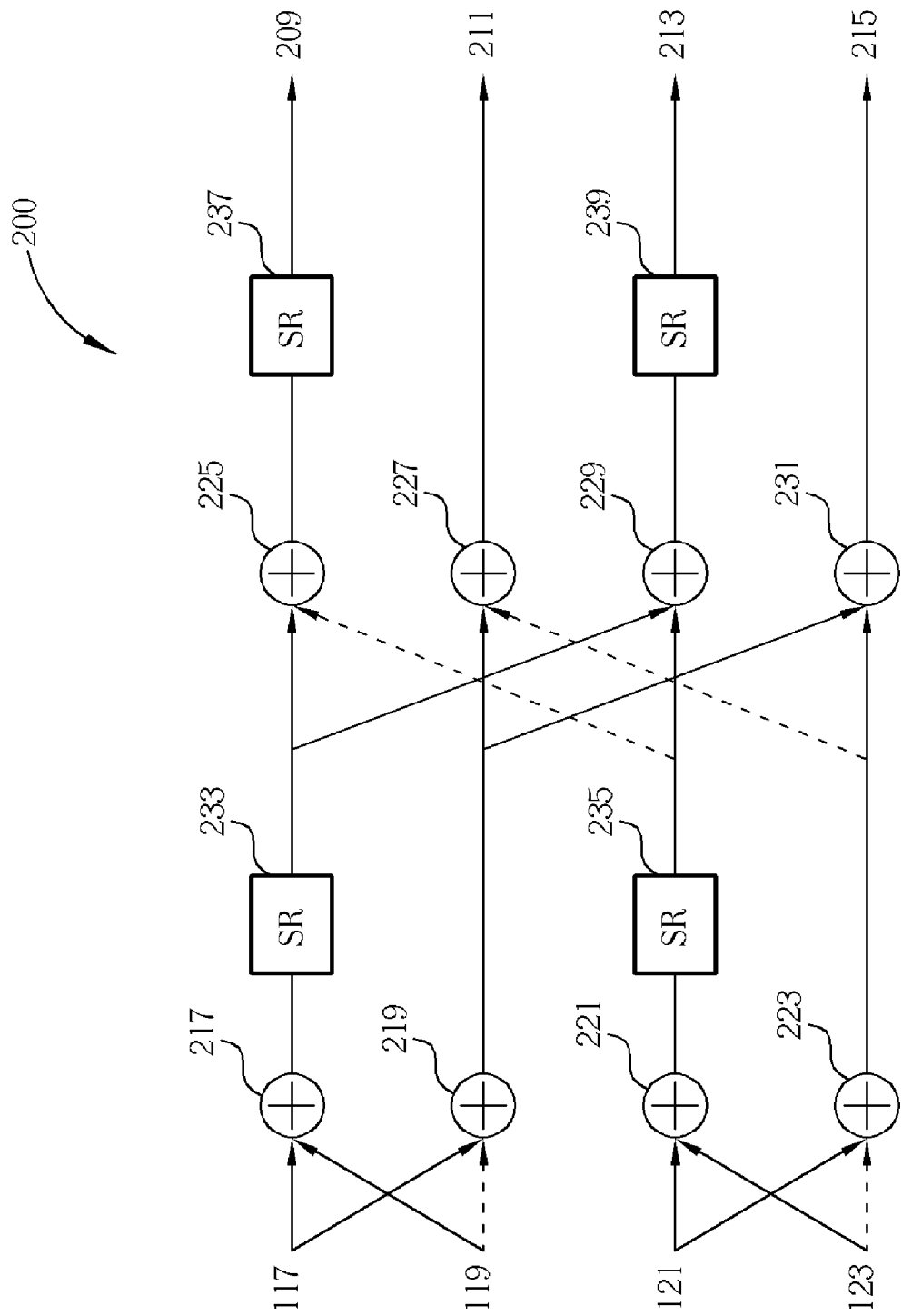
FIG. 2 is a diagram of an MHT device according to the present invention.

Please refer to FIG. 2, which is a diagram of an MHT device 200. The MHT device 200 is used to perform the MHT to transform the green pixel groups or the difference coding groups from the time domain to the frequency domain. The MHT device 200 comprises eight adders 217, 219, 221, 223, 225, 227, 229, 231, four shifting right (SR) logic units 233, 235, 237, 239, an output node 209 outputting low-frequency pixels, and three output nodes 211, 213, 215 outputting high-frequency pixels. Four input nodes of the MHT device 200 are connected with the four output nodes 117, 119, 121, 123 of the channel difference coding system 100. While performing the MHT, the green pixel group or the difference coding group is inputted into the four input nodes 117, 119, 121, 123. The four output nodes 209, 211, 213, 215 of the MHT device 200 output a low-frequency pixel and a plurality of high-frequency pixels. The output node 209 outputs a low-frequency pixel, while the output nodes 211, 213, 215 output three high-frequency pixels respectively. The adder 217 is coupled to the input nodes 117 and 119, and is used to add the pixel provided to the input node 117 with the pixel provided to the input node 119. The adder 219 is coupled to the input nodes 117 and 119, and is used to add the pixel provided to the input node 117 with the negative of the pixel provided to the input node 119. The adder 221 is coupled to the input nodes 121 and 123, and is used to add the pixel provided to the input node 121 with the pixel provided to the input node 123. The adder 223 is coupled to the input nodes 121 and 123, and is used to add the pixel provided to the input node 121 with the negative of the pixel provided to the input node 123. The shifting right logic unit 233 is connected to the output of the adder 217, and is used to shift right one bit of the outputted pixel inputted by the adder 221 one time. The shifting right logic unit 235 is connected to the output of the adder 221, and is used to shift right one bit of the outputted pixel inputted by the adder 221 one time. The adder 225 is connected to the outputs of the shifting right logic units 233 and 235, and is used to add the outputted pixels inputted by the shifting right logic units 233 and 235. The adder 227 is coupled to the outputs of the adders 219 and 223, and is used to add the pixel inputted by the adder 219 with the negative of the pixel inputted by the adder 223. The adder 229 is coupled to the outputs of the shifting right logic units 233 and 235, and is used to add the outputted pixel inputted by the shifting right logic unit 233 with the negative of the outputted pixel inputted by shifting right logic unit 235. The adder 231 is connected to the outputs of the adders 219 and 223, and is used to add the outputted pixels inputted by the adders 219 and 223. The shifting right logic unit 237 is connected to the output of the adder 225, and is used to shift right one bit of the outputted pixel inputted by the adder 225 one time. The shifting right logic unit 239 is connected to the output of the adder 229, and is used to shift right one bit of the outputted pixel inputted by the adder 229 one time.

Please refer to FIG. 3, which is a query table for operations of determining the value of the quantification factor. The operations are as follows:

(a) After transforming the three high-frequency parameters belonging to the green pixel group and the three high-frequency parameters belonging to the difference coding group into positive values, regard the three high-frequency parameters belonging to the green pixel group as a first high-frequency parameter (Ac0(green)), a second high-frequency parameter (Ac1 (green)), and a third high-frequency parameter (Ac2 (green)), and regard the three high-frequency parameters belonging to the difference coding group as a fourth high-frequency parameter (Ac0 (non-green)), a fifth high-frequency parameter (Ac1 (non-green)), and a sixth high-frequency parameter (Ac2 (non-green)). The steps of transforming high-frequency parameters into positive values discussed in Step 707 of FIG. 7.

(b) Shift right a specific number of bits of the first high-frequency pixel, the second high-frequency pixel, the third high-frequency pixel, the four high-frequency pixel, the fifth high-frequency pixel, and the sixth high-frequency pixel by using a shifting right logic unit several times, wherein the specific number is indicated by the columns of the six pixels belonging to one specific quantification factor and the specific quantification factor begins from zero in FIG. 3.

(c) Detect whether the first high-frequency parameter is larger than six bits, and whether other high-frequency parameters are larger than five bits. If the six high-frequency parameters are not larger than their respective specific numbers of bits, record the value of the quantification factor associated with the six specific numbers, which represent the respective numbers of bits shifted right in (b), and represent the value of the quantification factor in bits for being disposed into the positions of the three bits of the 48-bit binary value in Step 711 of FIG. 7 and Step 813 of FIG. 8, wherein the three bits of the 48-bit binary value represent the value of the quantification factor.

(d) In (c), if any one of the six high-frequency parameters does not satisfy their respective conditions about the detected bits, wherein the condition of a high-frequency parameter means that the detected bits of the high-frequency parameter are not larger than the specific number of bits mentioned in (c), then increment the quantification factor by one, detect the six high-frequency parameters associated with the incremented quantification factor, and execute (b), (c), and (d) repeatedly until one quantification factor satisfies all conditions in (c) or the value of the quantification factor reaches six.

Furthermore, while the value of the quantification factor is incremented to six, since (b), (c), and (d) are not necessarily executed anymore, the columns of the six high-frequency parameters associated with the quantification factor of value six are not shown in FIG. 3.

According to the value of the quantification factor retrieved in FIG. 3, the respective number of bits of the first through sixth high-frequency pixels are shifted right wherein the respective numbers are associated with the quantification factor.

For adjusting all low-frequency parameters of the green pixel group belonging to the frequency domain of the seven bits for fitting the designated format, all low-frequency parameters (dc_coef) of the green pixel group are adjusted by the following formula:

$$dc\_coef = (dc\_coef + 1) >> 1 \quad (1)$$

The formula transforms negative values into positive values without 2's complement and the support of additional adders so that it is more convenient than the prior art. Formula (1) is used to support the procedure of adjusting each low-frequency parameter in Step 709.

For adjusting all low-frequency parameters of the difference coding group belonging to the frequency domain to the seven bits for fitting for the designated format, all low-frequency parameters (dc_coef) of the green pixel group are adjusted by the following formula:

$$dc\_coef = (dc\_coef + 2) >> 2 \quad (2)$$

Formula (2) is used to support the procedure of adjusting each low-frequency parameter in Step 811.

Figure 4:
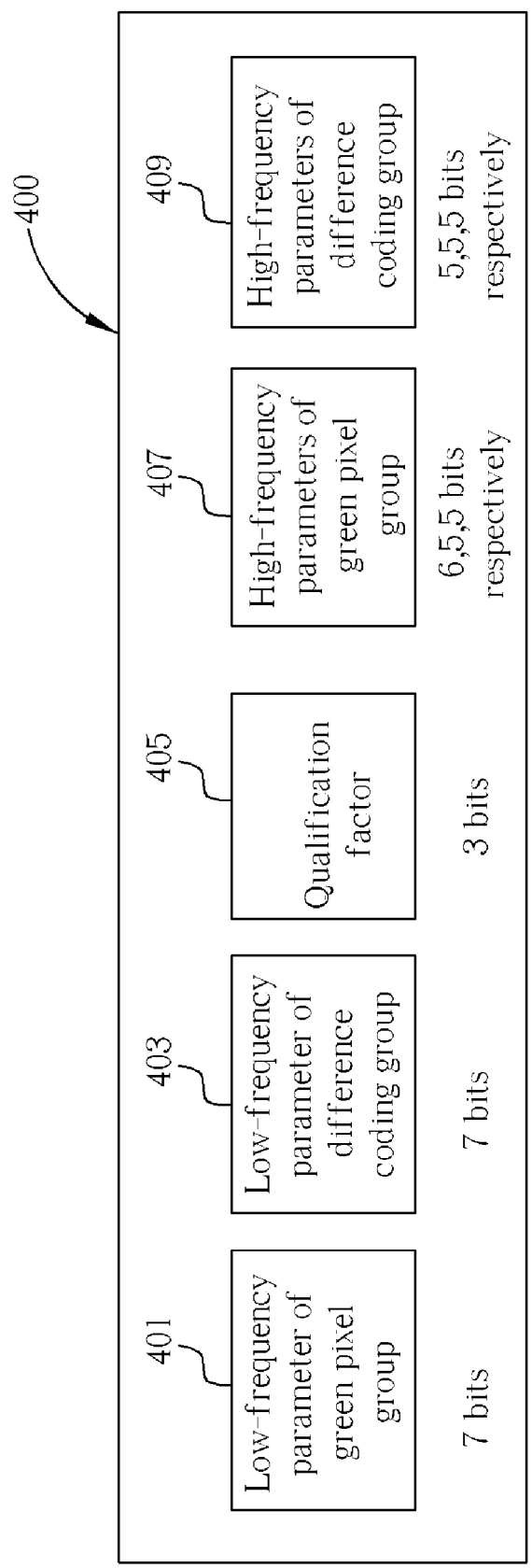
FIG. 4 is a diagram of a compressed storage unit according to the present invention.

Please refer to FIG. 4, which is a diagram of a compressed storage unit 400 having a size of 48 bits. The compressed storage unit 400 is used for illustrating the format of the 48-bit binary value in Step 711 of FIG. 7 and Step 813 of FIG. 8, and is used for illustrating the disposition method of each parameters and the quantification factor. The compressed storage unit 400 comprises a low-frequency parameter 401 belonging to the green pixel group, a low-frequency parameter belonging to the difference coding group, a quantification factor 405, a set 407 of high-frequency parameters belonging to the green pixel group, and a set 409 of high-frequency parameters belonging to the difference coding group. The low-frequency parameters 401 and 403 are respectively disposed in seven bits of the compressed storage unit 400. The low-frequency parameter 401 is adjusted according to formula (1), which supports Step 709 of FIG. 7. The low-frequency parameter 403 is adjusted according to formula (2), which supports Step 811 of FIG. 8. In the compressed storage unit 400, the low-frequency parameter 403 is appended to the low-frequency parameter 401. The value of the quantification factor 405 is determined by querying the query table in FIG. 3 according to the set 407 and the set 409 of high-frequency parameters. The quantification factor is disposed in three bits of the compressed storage unit 400 and is appended to the low-frequency parameter 403. The set 407 of high-frequency parameters comprises the first high-frequency parameter, the second high-frequency parameter, and the third high-frequency parameter, wherein the first high-frequency parameter includes six bits, while the second high-frequency parameter and the third high-frequency parameter include five bits each so that the set 407 of high-frequency parameters includes sixteen bits in the compressed storage unit 400. Additionally, the set 407 of high-frequency parameters is appended to the quantification factor 405. The set 409 of high-frequency parameters comprises the fourth high-frequency pixel, the fifth high-frequency pixel, and the sixth high-frequency pixel, wherein the three high-frequency parameters include five bits respectively so that the set 409 of high-frequency parameters includes 15 bits in the compressed storage unit 400. Additionally, the set 409 of high-frequency parameters is appended to the set 407 of high-frequency parameters.

After disposing all the parameters of the compressed storage unit 400, all the bits of the compressed storage unit 400 are stored in a buffer. The procedure of encoding ends here.

When the procedure of decoding begins, the stored bits of the buffer are extracted.

For decoding the low-frequency parameters belonging to the green pixel group, the low-frequency parameters belonging to the green pixel group are extracted from the stored bits of the buffer and decoded according to an inverse function of formula (1).

For decoding the low-frequency parameters belonging to the difference coding group, the low-frequency parameters belonging to the difference coding group are extracted from the stored bits of the buffer and decoded according to an inverse function of formula (2).

For decoding the high-frequency parameters belonging to the green pixel group, the high-frequency parameters belonging to the green pixel group and the quantification factor are extracted from the stored bits of the buffer, and a specific number of bits of the shifted-right first, second, third, fourth, fifth, and sixth high-frequency parameters of the green pixel group are respectively shifted left by using a shifting left logic unit several times. The specific numbers correspond to the value of the quantification factor and the query table of FIG. 3. Therefore the shifted-right high-frequency parameters of the green pixel group are decoded.

For decoding the high-frequency parameters belonging to the difference coding group, the high-frequency parameters belonging to the difference coding group and the quantification factor are extracted from the stored bits of the buffer, and a specific number of bits of the shifted-right first, second, third, fourth, fifth, and sixth high-frequency parameters of the difference coding group are respectively shifted left by using a shifting left logic unit several times. The specific numbers correspond to the value of the quantification factor and the query table of FIG. 3. Therefore the shifted-right high-frequency parameters of the difference coding group are decoded.

Figure 5:
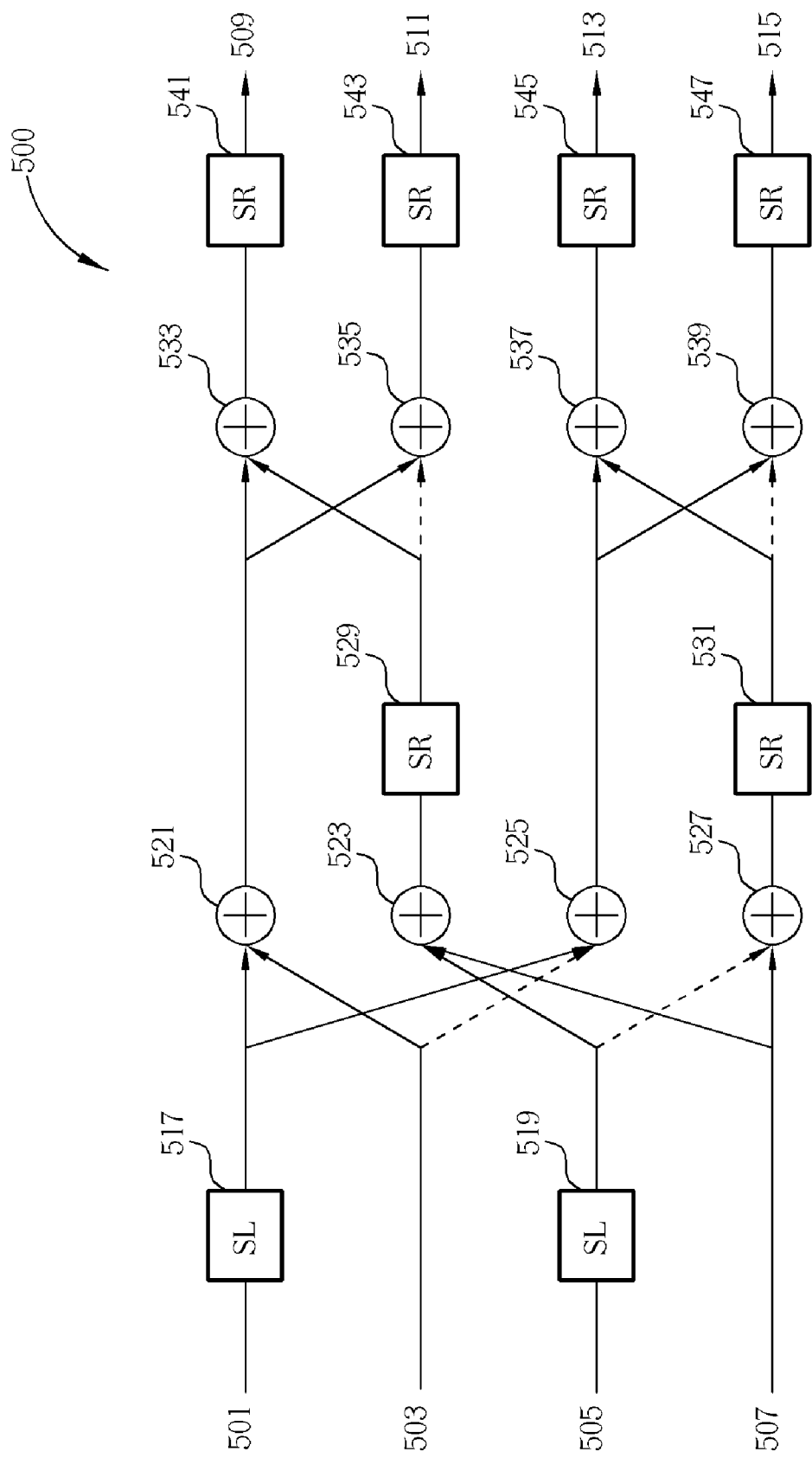
FIG. 5 is a diagram of an IMHT device according to the present invention.

Please refer to FIG. 5, which is a diagram of an IMHT device 500. The IMHT device is used to execute the inverse modified Hadamard transform for decoding the green pixel group or the difference coding group outputted by the output nodes 117, 119, 121, and 123 of the channel difference coding system 100. The IMHT device 500 comprises two shifting left (SL) logic units 517 and 519, six shifting right (SR) logic units 529, 531, 541, 545, 547, and 549, eight adders 521, 523, 525, 527, 533, 535, 537, and 539, an input node 501 used for inputting low-frequency parameters, three input nodes 503, 505, and 507 used for inputting high-frequency parameters, and four output nodes 509, 511, 513, 515. The IMHT device 500 is similar to the MHT device 200 shown in FIG. 2, and is used for receiving a decoded green pixel group or a decoded difference coding group at the input nodes 501, 503, 505, and 507 so that a decoded green pixel group belonging to the time domain or a difference coding group belonging to the time domain is outputted at the output nodes 509, 511, 513, and 515. The shifting left logic unit 517 is connected to the input node 501, and is used for shifting left one bit of the parameters inputted at the input node 501 one time. The shifting left logic unit 519 is connected to the input node 505, and is used for shifting left one bit of the parameters inputted at the input node 505 one time. The adder 521 is connected to the output of the left shifting logic unit 517 and the input node 503, and is used for adding the outputted parameters inputted by the left logic unit 517 to the inputted parameters inputted at the input node 503. The adder 523 is connected to the output of the shifting left logic unit 519 and the input node 507, and is used for adding the outputted parameters inputted by the shifting left logic unit 519 to the inputted parameters inputted at the input node 507. The adder 525 is coupled to the output of the shifting left logic unit 517 and the input node 503, and is used for adding the outputted parameters provided by the shifting left logic unit 517 to the negative of the inputted parameters inputted at the input node 503. The adder 527 is coupled to the shifting left logic unit 519 and the input node 507, and is used for adding the negative of the outputted parameters provided by the shifting left logic unit 519 to the inputted parameters inputted at the input node 507. The shifting right logic unit 529 is connected to the output of the adder 523, and is used for shifting right one bit of the outputted parameters inputted by the adder 523 one time. The shifting right logic unit 531 is connected to the output of the adder 527, and is used for shifting right one bit of the outputted parameters inputted by the adder 527 one time. The adder 533 is connected to the output of the adder 521 and the output of the shifting right logic unit 529, and is used for adding the outputted parameters inputted by the adder 521 to the outputted parameters inputted by the shifting right logic unit 529. The adder 535 is coupled to the output of the adder 521 and the output of the shifting right logic unit 529, and is used for adding the outputted parameters inputted by the adder 521 to the negative of the outputted parameters inputted by the shifting right logic unit 529. The adder 537 is connected to the output of the adder 525 and the output of the shifting right logic unit 531, and is used for adding the outputted parameters inputted by the adder 525 to the outputted parameters inputted by the shifting right logic unit 531. The adder 539 is coupled to the output of the adder 525 and the output of the shifting right logic unit 531, and is used for adding the outputted parameters inputted by the adder 525 to the negative of the outputted parameters inputted by the shifting right logic unit 531. The shifting right logic units 541, 543, 545, and 547 are respectively connected to their corresponding outputs of the adders 533, 535, 537, and 539, and are respectively used for shifting right one bit of the outputted parameters inputted respectively by the adders 533, 535, 537, and 539 one time.

Figure 6:
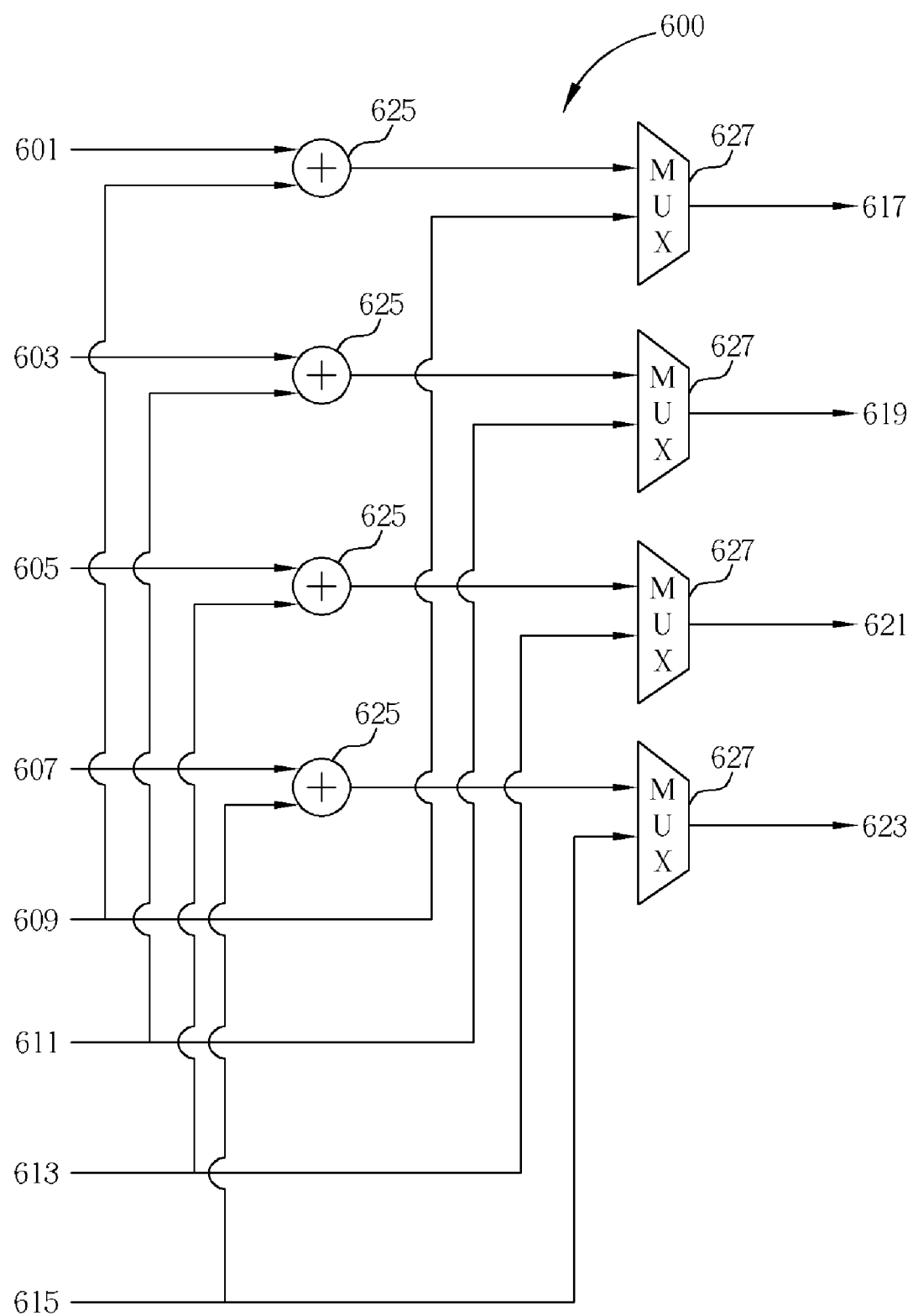
FIG. 6 is a diagram of another channel difference coding system according to the present invention.

Please refer to FIG. 6, which is a diagram of a channel difference coding system 600. The channel difference coding system 600 is capable of generating a decoded non-green pixel group by adding a decoded green pixel group belonging to the time domain to a decoded difference coding group also belonging to the time domain. The channel difference coding system 600 is also capable of outputting a decoded green pixel group belonging to the time domain directly. The channel difference coding system 600 comprises four adders 625; four multiplexers 627; four input nodes 601, 603, 605, and 607, which are used for inputting parameters belonging to the difference coding group; four input nodes 609, 611, 613, and 615, which are used for inputting the parameters belonging to the green pixel group; and four output nodes 617, 619, 621, and 623. The inputted parameters of the input nodes 601, 603, 605, and 607 are outputted at the output nodes 509, 511, 513, and 515 of FIG. 5 while processing the difference coding group. The inputted parameters of the input nodes 609, 611, 613, and 615 are outputted at the output nodes 509, 511, 513, and 515 of FIG. 5 while processing the green pixel group. Each adder 625 is connected to an input node corresponding to the difference coding group and an input node corresponding to the green pixel group, and is used for adding the inputted parameters of the difference coding group with the inputted parameters of the green pixel group. Each multiplexer 627 is connected to an output of the adders and an input node corresponding to the green pixel group, and determines whether to generate a decoded non-green pixel group or output an inputted and decoded green pixel group directly. Each multiplexer 627 outputs one of the two types of outputs according to its enabling state, wherein the enabling states of the four multiplexers 627 are the same. While the connections between the four multiplexers 627 and the four adders 625 are enabled, a decoded non-green pixel group is outputted at the output nodes 617, 619, 621, and 623. While the connections between the four multiplexers 627 and the four input nodes 609, 611, 613, and 615 are enabled, a decoded green pixel group is outputted at the output nodes 617, 619, 621, and 623 directly.

Figure 7:
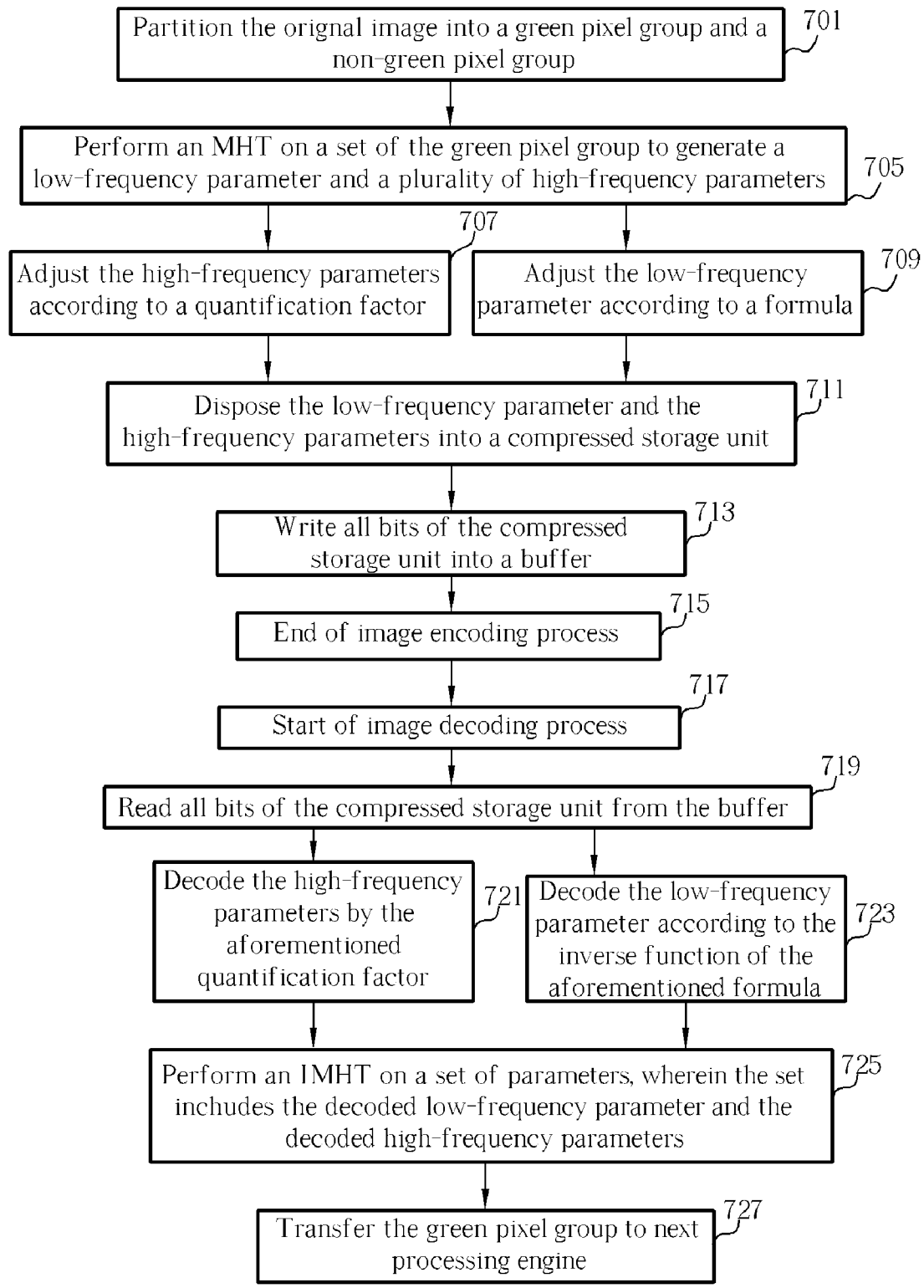
FIG. 7 is a flowchart of a method of encoding and decoding a green pixel group in the present invention.

Please refer to FIG. 7, which is a flowchart of a method of encoding and decoding the green pixel group in the present invention. Steps of the flowchart and the method of encoding and decoding the difference coding group can overlap and support each other. The steps are as follows:

Step 701: Partition all original pixels into a green pixel group and a difference coding group, wherein a set of each group includes four parameters.

Step 705: Transform the green pixel group from the time domain to the frequency domain to generate a green pixel group belonging to the frequency domain by way of the modified Hadamard transform (MHT). In the present invention, four parameters are transformed at one time by the modified Hadamard transform, i.e. one set of parameters is transformed at one time. In the prior art, a discrete cosine transform (DCT) is often applied for transforming parameters from the time domain to the frequency domain. However, the bits required by the low-frequency parameters are more than the bits required by the low-frequency parameters of the MHT, which is one aspect of the present invention. Any set of the green pixel group includes four parameters, wherein one of the four parameters is a low-frequency parameter while the other three parameters are high-frequency parameters.

Step 707: The value of the quantification factor is determined by all high-frequency parameters of the green pixel group and the difference coding group, wherein both groups are in the frequency domain. Furthermore, the quantification factor includes three bits. Before adjusting all high-frequency parameters of the green pixel group and the difference coding group by the retrieved quantification factor, all high-frequency parameters, ac, of the green pixel group and the difference coding group must be transformed into positive values. The transforming formulae are:

$$\text{if (positive) ac}=\{ac<<1, 1'b0\}; \tag{3}$$

$$\text{else ac}=\{\sim ac<<1, 1'b1\}; \tag{4}$$

The difference between the formulae and prior art is that the formulae are capable of transforming negative values into positive values without 2's complement and additional adders. Then, the value of the quantification factor is determined by querying the query table of FIG. 3. The three high-frequency parameters belonging to the green pixel group and the three high-frequency parameters belonging to the difference coding group are respectively shifted right a specific number of bits corresponding to the value of the quantification factor by using a shifting right logic unit several times so that all high-frequency parameters are adjusted. The method of querying the query table of FIG. 3 is explained above along with FIG. 3.

Step 711: Since the image data before being encoded is represented by a binary value of 64 bits, and the image data after being encoded is represented by a binary value of 48 bits, the 48-bit binary value must include one low-frequency parameter and three high-frequency parameters of the green pixel group belonging to the frequency domain, one low-frequency parameter and three high-frequency parameters of the difference coding group belonging to the frequency domain, and a quantification factor. The format of the 48-bit binary value corresponding to each parameter and the quantification factor is explained above along with FIG. 4. The number of bits corresponding to each group is explained as follows. In the format of the 48-bit binary value, the low-frequency parameters corresponding to the green pixel group and the difference coding group respectively include seven bits, therefore, there are still 34 bits preserved for disposing the quantification factor, the three high-frequency parameters of the green pixel group, and the three high-frequency parameters of the difference coding group. The value of the quantification factor is determined by the three high-frequency parameters of the green pixel group and the three high-frequency parameters of the difference coding group, and the quantification factor is three bits. In Step 707, the value of the quantification factor is determined by querying a query table, therefore the three high-frequency parameters of the green pixel group and the three high-frequency parameters of the difference coding group can be respectively shifted right a specific number bits according to the value of the quantification factor by using a shifting right logic unit several times. The purpose of shifting the parameters right is to fill the remaining bits of the 48-bit binary value. Now the number of bits of each group and the quantification factor can be determined in the format of the 48-bit binary value.

Step 723: Extract the bits of the low-frequency parameters of the green pixel group belonging to the frequency domain from the buffer, and decode the low-frequency parameters of the green pixel group by the inverse function of formula (1) so that the decoded low-frequency parameters of the green pixel group are retrieved.

Step 725: In the green pixel group belonging to the frequency domain, a green pixel group belonging to the time domain is retrieved by transforming the high-frequency parameters retrieved in Step 721 and the low-frequency parameters retrieved in Step 723 from the frequency domain to the time domain by way of an IMHT. The retrieved green pixel group is essentially the same as the green pixel group of Step 701, and is a decoded group.

Figure 8:
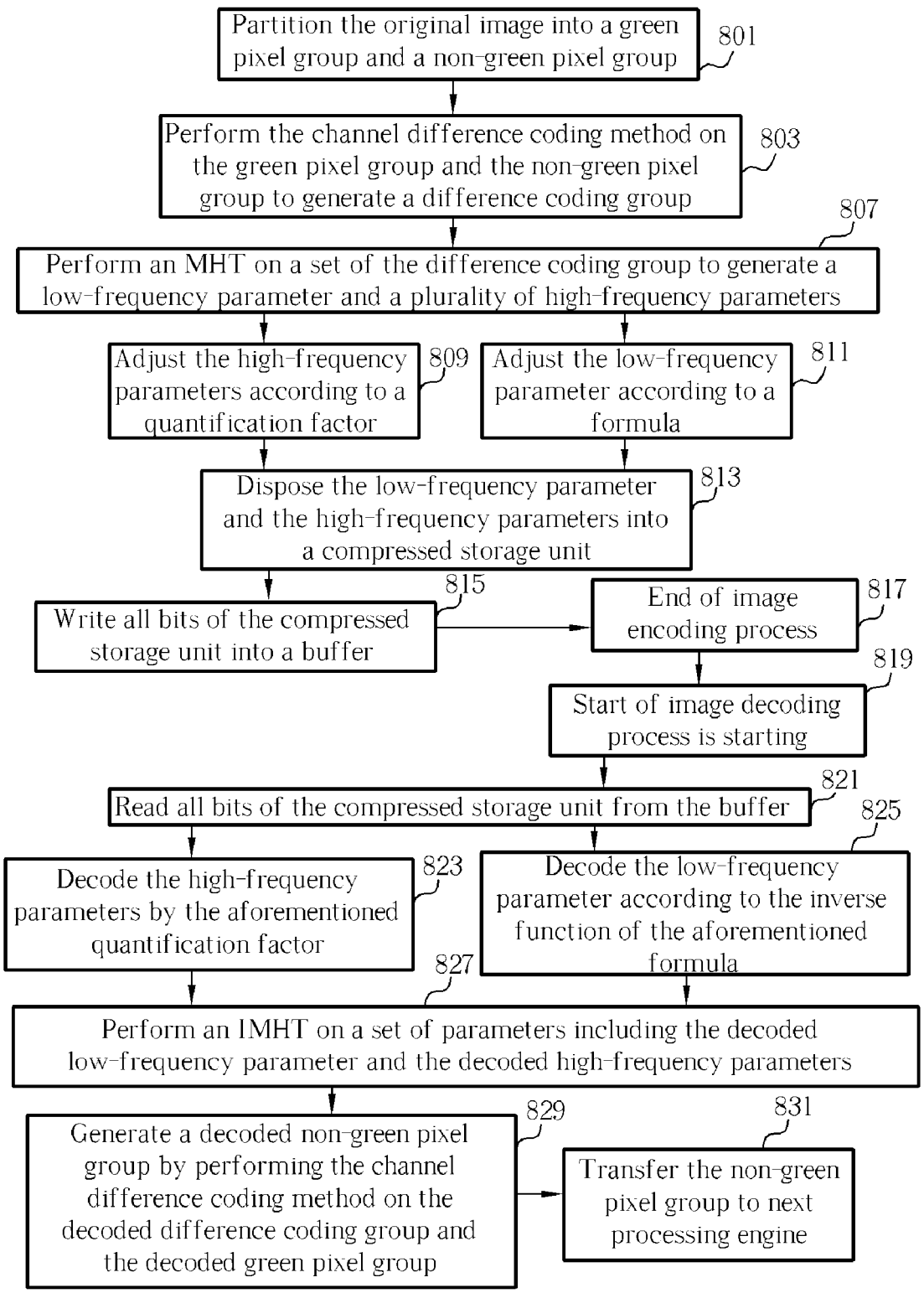
FIG. 8 is a flowchart of a method of encoding and decoding a difference coding group in the present invention.

Please refer to FIG. 8, which is a flowchart of the method of encoding and decoding a difference coding group in the present invention. Steps of the flowchart and the method of encoding and decoding the green pixel group can overlap and support each other, wherein the overlapping and supporting steps are explained above along with FIG. 7. Therefore, the overlapping and supporting steps are not repeated below. E.g. since Step 801 is essentially the same as Step 701, description for Step 801 is not repeated.

Step 803: For reducing the number of processed bits, a method of subtraction is applied to the green pixel group and the non-green pixel group for performing the channel difference coding.

Step 807: Transform the difference coding group belonging to the time domain from the time domain to the frequency domain so that a difference coding group belonging to the frequency domain is generated. Any set of the difference coding group includes four parameters, wherein one of the parameters is a low-frequency parameter while the other three parameters are high-frequency parameters. The remainder of Step 807 is consistent with Step 705, and so is not repeated.

Steps 809 and 813 are the same as steps 707 and 711, respectively.

Step 825: Extract the bits of the low-frequency parameters of the difference coding group belonging to the frequency domain from the buffer, and decode the low-frequency parameters of the difference coding group by the inverse function of formula (2) so that the decoded low-frequency parameters of the difference coding group are retrieved.

Step 827: Regard the high-frequency parameters retrieved in Step 823 and the low-frequency parameters retrieved in Step 825 as a decoded difference coding group belonging to the frequency domain. In the decoded difference coding group, transform the high-frequency parameters retrieved from Step 823 and the low-frequency parameters retrieved from Step 825 from the frequency domain to the time domain by way of an IMHT to generate a difference coding group belonging to the time domain. The generated difference coding group is essentially the same as the difference coding group of Step 803, and is a decoded group.

Step 829: Perform the channel difference coding on the green pixel group retrieved from Step 725 and the difference coding group retrieved from Step 827 by way of addition so that a decoded non-green pixel group is generated. The decoded non-green pixel group is essentially the same as the non-green pixel group of Step 801, and is a decoded group.

The method of the present invention is capable of encoding the pixel groups represented by binary values of 64 bits into pixel groups represented by binary values of 48 bits, and decoding the pixel groups represented by binary values of 48 bits back to the pixel groups represented by binary values of 64 bits. As illustrated in FIG. 7, the encoding process of the green pixel group is represented by Steps 701, 705, 707, 709, 711, 713, and 715, while the decoding process of the green pixel group is represented by Steps 717, 719, 721, 723, 725, and 727. As illustrated in FIG. 8, the encoding process of the difference coding group is represented by Steps 801, 803, 807, 809, 811, 813, 815, and 817, while the decoding process of the difference coding group is represented by Steps 819, 821, 823, 825, 827, 829, and 831.

Compared with the method of encoding image data by performing difference pulse coding, which makes use of the associability between adjoining pixels, the present invention makes use of the property that most of the energy of the image data is concentrated in the low-frequency part. Therefore, the low-frequency part of the image data is encoded with low distortion, while the high-frequency part is encoded with higher distortion. In addition, taking the three primary colors of red, green, and blue (RGB) into consideration, most energy is concentrated in the green pixels, while less is in the red pixels and the blue pixels. In other words, the probability of finding a green pixel in the original image is significantly higher than the probability of finding a red or a blue pixel in the original image. Therefore, the green pixels can be encoded with low distortion while the red pixels and the blue pixels can tolerate higher distortion, such as in a channel difference coding method making use of the parameters representing the green pixels. In Step 701 of FIG. 7 and in Step 801 of FIG. 8, the green pixels and the non-green pixels are separated in advance for such different encoding methods applied on pixels of different primary colors.

Compared with the methods of the prior art, the embodiment of the present invention overcomes the phenomenon in which the quality of the image data is decreased significantly in places where the variance between adjoining pixels is much more pronounced. This phenomenon is overcome by making use of the differing properties of the primary colors. Although the non-green pixels are encoded to a larger degree than the green pixels, the effect of encoding the non-green pixels has a negligible effect on the quality of image encoding since the probability of finding a non-green pixel in the original image is much lower. The distortion caused by the unexpected associability between adjoining pixels is also decreased significantly because the present invention considers the energy distribution of the three primary colors and is thus is capable of showing each primary color in higher fidelity than the prior art. Moreover, the present invention uses fewer bits in the low-frequency part of the image data than the methods of the prior art. This is achieved by performing the MHT, which is essentially addition and subtraction, and by considering the number of bits in the low-frequency part of the image data.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of encoding and decoding image data by applying an image capturing device comprising:
 (a) generating a difference coding group according to green pixels and pixels of another color of a set of pixels;
 (b) applying a modified Hadamard transform (MHT) on the difference coding group to generate a corresponding low-frequency parameter and a plurality of corresponding high-frequency parameters;

(c) adjusting the low-frequency parameter to fit a designated format;
(d) adjusting the plurality of high-frequency parameters according to a quantification factor;
(e) restoring the adjusted low-frequency parameter;
(f) restoring the plurality of adjusted high-frequency parameters according to the quantification factor; and
(g) applying an inverse modified Hadamard transform (IMHT) on the restored low-frequency parameter and the plurality of restored high-frequency parameters to restore the difference coding group.

2. The method of claim 1 further comprising:
(h) applying an MHT on green pixels of the set of the pixels to generate a second low-frequency parameter and a plurality of second high-frequency parameters;
(i) adjusting the second low-frequency parameter;
(j) adjusting the plurality of second high-frequency parameters;
(k) restoring the adjusted second low-frequency parameter;
(l) restoring the plurality of adjusted second high-frequency parameters according to the quantification factor; and
(m) applying an IMHT on the restored second low-frequency parameter and the plurality of restored second high-frequency parameters to restore the green pixels of the set of pixels.

3. The method of claim 2 further comprising:
(n) restoring pixels of another color of the set of pixels according to the restored green pixels and the restored difference coding group.

4. The method of claim 3 wherein step (a) comprises generating the difference coding group according to green pixels and red pixels of the set of pixels and step (n) comprises restoring the red pixels of the set of pixels according to the green pixels restored in step (m) and the difference coding group restored in step (g).

5. The method of claim 3 wherein step (a) comprises generating the difference coding group according to green pixels and blue pixels of the set of pixels and step (n) comprises restoring the blue pixels of the set of pixels according to the green pixels restored in step (m) and the difference coding group restored in step (g).

6. A method of decoding image data by applying an image capturing device comprising:
(a) generating a difference coding group according to green pixels and another color of pixels of a set of pixels;
(b) applying a modified Hadamard transform (MHT) on the difference coding group to generate a corresponding low-frequency parameter and a plurality of corresponding high-frequency parameters;
(c) adjusting the low-frequency parameter to fit a designated format;
(d) adjusting a plurality of high-frequency parameters according to a quantification factor;
(e) applying an MHT on green pixels of the set of pixels to generate a corresponding second low-frequency parameter and a plurality of corresponding second high-frequency parameters;
(f) adjusting the second low-frequency parameter; and
(g) adjusting a plurality of second high-frequency parameters according to the quantification factor.

7. The method of claim 6 wherein step (a) comprises generating the difference coding group according to green pixels and red pixels of the set of pixels.

8. The method of claim 6 wherein step (a) comprises generating the difference coding group according to green pixels and blue pixels of the set of pixels.

* * * * *